Sept. 18, 1923.  
F. W. WOGLOM  
1,468,590  
STATISTICAL RECORD AND FILING DEVICE  
Filed March 1, 1922  2 Sheets-Sheet 1

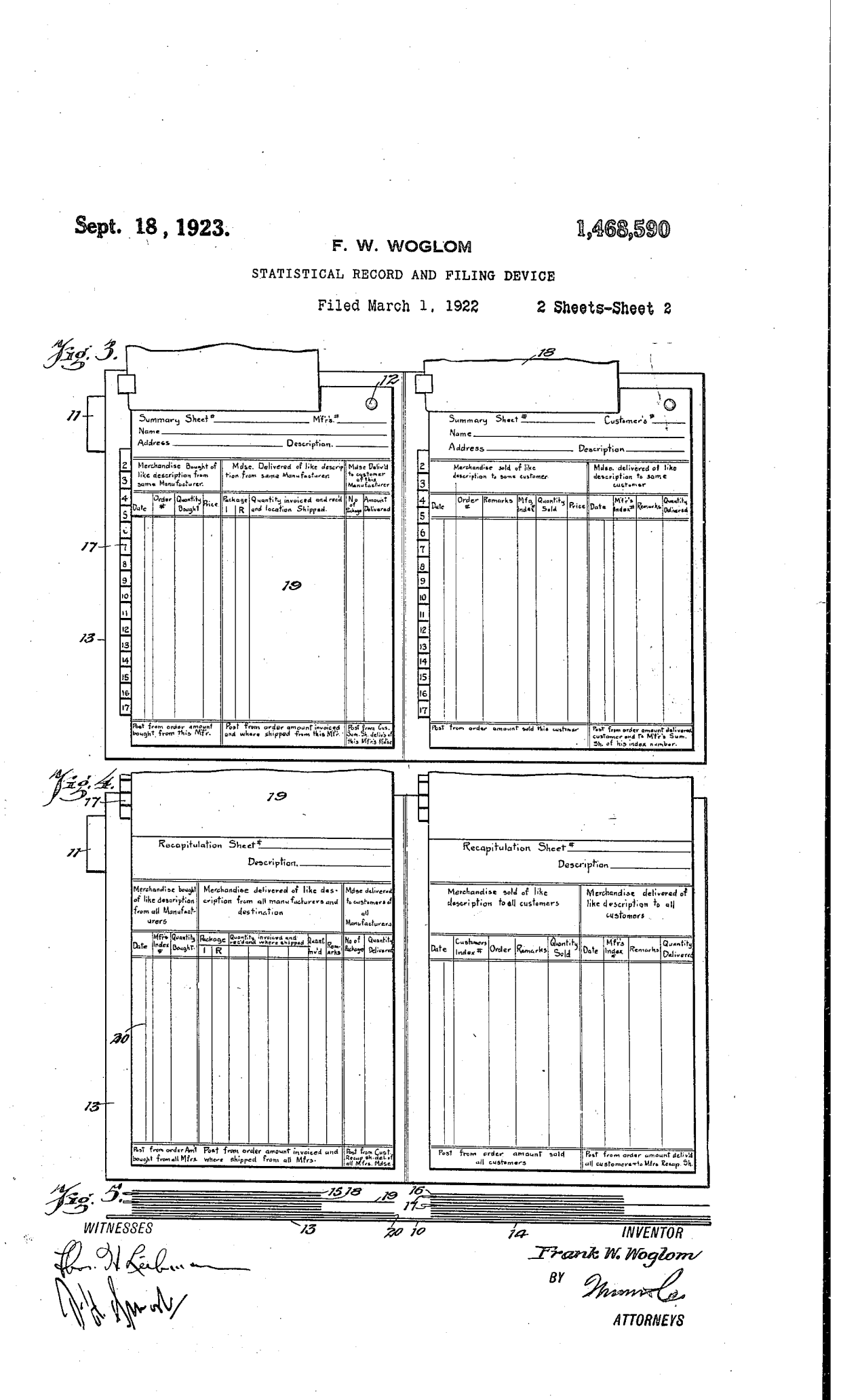

Sept. 18, 1923.

F. W. WOGLOM 1,468,590

STATISTICAL RECORD AND FILING DEVICE

Filed March 1, 1922

Patented Sept. 18, 1923.

1,468,590

UNITED STATES PATENT OFFICE.

FRANK W. WOGLOM, OF ARLINGTON, NEW JERSEY.

STATISTICAL RECORD AND FILING DEVICE.

Application filed March 1, 1922. Serial No. 540,081.

*To all whom it may concern:*

Be it known that I, FRANK W. WOGLOM, a citizen of the United States, and resident of Arlington, in the county of Hudson and State of New Jersey, have invented a new and Improved Statistical Record and Filing Device, of which the following is a full, clear, and exact description.

My invention relates to a statistical record and filing device, or system, and aims to provide certain new and useful improvements in this art.

It is well appreciated where it is necessary to keep a relatively complicated record which will, for instance embrace a manufacturer's index, and a customer's index, together with the supplies purchased on different dates by the manufacturer, and supplies ordered on different dates by the customer, that considerable difficulty has been experienced incident to the necessary compilation of the records. Thus when it becomes necessary to obtain certain information even on only one or two points, it usually consumes considerable time for the bookkeeper or clerk to be able to compile this data.

Thus it is an object of this invention to provide a statistical record and filing device, or system, whereby a complete and accurate record of all transactions between, for example, a manufacturer and a customer, together with the nature of the article, etc., may be kept.

It is a further object of this invention to provide a record and device of the type specified, by means of which an entry clerk may be enabled to keep the record entirely complete and up to date, incident to the fact that it will not be necessary for him to make different entries in different ledgers.

Still another object of this invention is that of providing an article of the type stated which will provide, among other things, a system of checking, serving to automatically bring the clerk's attention to any errors which may have occurred due to carelessness, thus enabling this error to be corrected, and saving confusion.

A still further benefit derived by the use of my invention is to be predicated to the fact that by the use of the same a great amount of bookkeeping heretofore regarded as essential, in connection with records of this nature, may be dispensed with, this being irrespective of the intricate nature of the work.

My invention further provides a filing device which may be in the nature of a folder, each folder being complete in itself, whereby to enable the entry clerk or bookkeeper to keep the records of any number of manufacturers and customers within the same.

Further objects of this invention will become apparent in the annexed specification taken in connection with the drawings, which latter illustrate one practical embodiment of the same, and in which;

Figure 1 illustrates the folder which is preferably utilized in open condition, and showing the top sheets of the statistical record.

Figure 2 is a similar view but showing the index and first underlying sheet raised to disclose the other underlying sheets.

Figure 3 is a further view corresponding to Figures 1 and 2 showing the summary sheet.

Figure 4 is a further view and showing all of the leaves raised to disclose the recapitulation sheet, and Figure 5 is a somewhat diagrammatic end view of the device as shown in Figure 1.

It is to be understood that while I have shown one practical type of statistical record and folder, that my invention is equally applicable to different types of records or folders. In other words, the data appearing in the record may be altered to conform to that particular class of goods for which the same is intended, and the construction of the filing device or folder may be changed to correspond to the type of files in which it is to be placed.

Thus as in Figure 1, the reference numeral 10 indicates a folder such as is used ordinarily for filing, the said folder being preferably provided with a tab 11 which will serve to identify the subject matter embraced by the said folder. Also secured within the folder by any suitable means such as for instance spikes 12, is the statistical data hereinafter described. It is to be noted that the securing means for effecting this attachment may be of any desired character, but I preferably employ a medium which will permit of the addition to, or removal of certain of the statistical data so that the record may be expanded according to the needs of the business.

Referring more particularly to the data, it will be seen in Figure 1, that each folder is divided into two main sections 13 and 14, respectively, the former being dedicated to the manufacturer, while the latter is employed for the customer. Thus the upper sheets 15 and 16 of each of these sections is preferably in the nature of an index so that when the folder is open, the data relating to any particular manufacturer or customer may be readily found. Each of the main sections is built up of a number of units each of which latter are devoted to one particular customer or manufacturer, the initial sheet of each of these units being preferably provided with an identifying mark (not shown, but to be applied to the left of the #-indicium shown on the sheets 18 having exposed faces in Fig. 2) corresponding to the mark or number appearing in the index in association with an entry of the name of the appropriate party on one of the cross-ruled lines of sheets 15 and 16 of Fig. 1. Thus in the embodiment illustrated in which these marks are preferably in the nature of properly identified tabs 17, it will be obvious that any unit desired will be instantly available by simply glancing at the proper index to ascertain the identifying symbol of the data required, and in turning up all sheets of data until the unit desired is available.

As in Figure 2 each of the units may be built up of any desirable number of sheets 18 which may be printed in any desirable manner, it being noted, however, that these latter sheets preferably only cover a portion of a folder section. By utilizing this construction and assuming that the last leaf of each unit is in the nature of a summary sheet 19, as in Figure 3, it will be obvious that a certain amount of the latter sheet will be visible, even although the major portion of the same is covered by the sheet 18, as in Figure 2. Thus the entry clerk is enabled to carry over the most essential data to the summary sheet 19 without folding back the sheets 18, and also it will be obvious that these sheets may be examined in conjunction with the illustrated or any other entered totals of the exposed column or columns adjacent to the right-hand edge of the summary sheet 19 without lowering and raising the sheets 18.

Finally as in Figure 4 the last sheet of each section is preferably in the nature of a recapitulation sheet 20 in which the essential data of each summary sheet 19 is aggregated, thus providing a statistical record and filing device which will be extremely simple and compact, and which will accomplish all of the objects of this invention.

Also it will be understood that a person examining a record of this nature, will be immediately enabled to know as to whether an account is long or short, and also my improved device will serve to enable a person examining the record to be absolutely certain of the correctness of the results. Further it will be obvious that by utilizing the device and record aforedescribed that one may immediately ascertain what is due to each of the customers and to all customers, as well as what is due from each manufacturer and from all manufacturers, all of these items being capable of readily being checked as to correctness.

It will be obvious that numerous departures from the printed data shown, as well as structural variations of each main section may readily be resorted to without in the least departing from the scope of my claims; which are—

1. As a new article of manufacture, a record keeper for a particular article of merchandise, including a folder comprising two leaves, a pile of data carrying sheets on the inner face of one leaf and secured to that leaf along an edge of the pile, said pile having associated therewith indicia indicating it is to be the recipient of records relative to different manufacturers supplying said article, and a pile of data carrying sheets on the inner face of the other leaf and secured to that leaf along an edge of the pile, said pile having associated therewith indicia indicating it is to be the recipient of records relative to different customers supplied with the same article; each pile comprising a plurality of distinctively separate groups of sheets, one group in the first mentioned pile for each manufacturer and one group in the second mentioned pile for each customer; each group including a separate sheet for each particular transaction with the party particular to that group and each such sheet in the group carrying permanent indicia indicating the specific entries required; each group also including a sheet which is the lowermost in the group and which carries permanent indicia indicating the specific entries required to constitute said sheet a constantly up-to-date summary of certain entries of all the other sheets of its group, such summary sheet having a portion protruding beyond the other sheets of its group, such protruding portion carrying permanent indicia indicating the location of summarizing postings of entries thereto from the other sheets in its group.

2. The record keeper defined in claim 1, wherein one of the piles carries a lowermost sheet carrying permanent indicia for indicating certain entries to be posted from all the summary sheets of its pile to constitute said lowermost sheet a recapitulation sheet.

FRANK W. WOGLOM.